United States Patent
Iwaya et al.

(10) Patent No.: US 7,408,019 B2
(45) Date of Patent: Aug. 5, 2008

(54) FLUORINATED ETHER COMPOUND

(75) Inventors: Masao Iwaya, Yokohama (JP); Kazuya Oharu, Yokohama (JP); Hirokazu Takagi, Yokohama (JP); Hidekazu Okamoto, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 175 days.

(21) Appl. No.: 11/410,896

(22) Filed: Apr. 26, 2006

(65) Prior Publication Data
US 2006/0199979 A1    Sep. 7, 2006

Related U.S. Application Data

(63) Continuation of application No. PCT/JP2004/016158, filed on Oct. 29, 2004.

(30) Foreign Application Priority Data
Oct. 31, 2003 (JP) .............................. 2003-372652

(51) Int. Cl.
*C08G 73/24* (2006.01)
*C07C 43/11* (2006.01)
(52) U.S. Cl. ........................ 528/401; 568/579; 568/615
(58) Field of Classification Search ................ 528/401; 568/579, 615
See application file for complete search history.

(56) References Cited

U.S. PATENT DOCUMENTS 4,898,991 A   2/1990   Huang
4,996,369 A   2/1991   Kalota et al.

FOREIGN PATENT DOCUMENTS

| EP | 0 267 627 A1 | 5/1988 |
| EP | 0 355 726 A1 | 2/1990 |
| JP | 61-255978 | 11/1986 |

OTHER PUBLICATIONS

Tonelli, Claudio, et al., Photolysis of Perfluoroacyl Fluorides, Journal of Fluorine Chemistry, vol. 101, No. 1, 2000, pp. 117-123.
Yamabe, Masaki, et al., Newest Aspect of Fluoro Functional Material, CMC, 1994, pp. 172-176.

*Primary Examiner*—Duc Truong
(74) *Attorney, Agent, or Firm*—Oblon, Spivak, McClelland, Maier & Neustadt, P.C.

(57) ABSTRACT

A novel fluorinated ether compound useful as an inert medium is provided.

The compound is represented by the following formula (1) such as the compound represented by the following formula (1a) or the compound represented by the following formula (1b):

$$R^{F1}OCFR^{F2}CFR^{F2}OR^{F1} \quad (1)$$

$$F(CF_2)_4OCF(CF_3)CF(CF_3)O(CF_2)_4F \quad (1a)$$

$$F(CF_2)_6OCF(CF_3)CF(CF_3)O(CF_2)_6F \quad (1b)$$

wherein the symbols have the following meanings:
$R^{F1}$ is a $C_{4-7}$ linear perfluoroalkyl group; and
$R^{F2}$ is a fluorine atom or a trifluoromethyl group.

11 Claims, No Drawings

FLUORINATED ETHER COMPOUND

TECHNICAL FIELD

The present invention relates to a novel fluorinated ether compound useful as an inert medium, etc.

BACKGROUND ART

As fluorinated inert media, perfluoroalkanes such as $C_5F_{12}$ or $C_8F_{18}$, perfluoroethers such as a compound represented by the following formula (2), and perfluoroalkylamines such as $(C_4F_9)_3N$, are, for example, known. These fluorinated inert media are used as an insulating oil in the field of electronics, as a medium for e.g. thermal shock tests or leak tests, as an oxygen carrier in the medical field, or as a cleaning or dewatering agent in the industrial field (e.g. Non-Patent Document 1).

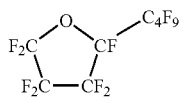
(2)

Non-Patent Document 1: "Newest Aspect of Fluoro Functional Material" compiled by Masaki Yamabe and Masashi Matsuo, published by CMC, 1994, p. 172-176

DISCLOSURE OF THE INVENTION

Problems to be Solved the by the Invention

However, with respect to most of the fluorinated inert media, their starting materials were difficult to obtain in a large quantity, and therefore, their production in an industrial-scale was also difficult. Further, with a fluorinated inert medium, the physical properties as a compound such as the boiling point, melting point or vapor pressure are extremely important, and these physical properties vary significantly depending upon the structure of the compound. Furthermore, in a case where the fluorinated inert medium is to be employed, it is necessary to select a compound that shows optimal physical properties depending upon the particular application. But, along the expansion of applications of the fluorinated inert media in recent years, fluorinated inert media having various structures are demanded. However, in many cases, fluorinated inert media which have already been known, are mixtures of a plurality of compounds having different carbon numbers, and in the medical field or the like where a fluorinated inert medium having a single-composition and a high-purity is required, there has been a problem that useful fluorinated inert media are limited.

Means to Solve the Problems

The present invention has been made for the purpose of solving the above problems, and provides a novel fluorinated ether compound useful as an inert medium, etc. Namely, the present invention provides the following:
<1> A compound represented by the following formula (1):

$$R^{F1}OCFR^{F2}CFR^{F2}OR^{F1} \quad (1)$$

wherein the symbols have the following meanings:
$R^{F1}$ is a $C_{4-7}$ linear perfluoroalkyl group; and
$R^{F2}$ is a fluorine atom or a trifluoromethyl group.

<2> A compound represented by the following formula (1a) or a compound represented by the following formula (1b):

$$F(CF_2)_4OCF(CF_3)CF(CF_3)O(CF_2)_4F \quad (1a)$$

$$F(CF_2)_6OCF(CF_3)CF(CF_3)O(CF_2)_6F \quad (1b)$$

<3> A method for producing a compound represented by the following formula (1), characterized by subjecting two molecules of a compound represented by the following formula (4) to a coupling reaction, or subjecting two molecules of at least one compound selected from the group consisting of a compound represented by the following formula (5) and a compound represented by the following formula (6), to a coupling reaction:

$$R^{F1}OCFR^{F2}COF \quad (4)$$

$$R^{F1}OCFR^{F2}COOH \quad (5)$$

$$R^{F1}OCFR^{F2}COOM \quad (6)$$

$$R^{F1}OCFR^{F2}CFR^{F2}OR^{F1} \quad (1)$$

wherein the symbols have the following meanings:
$R^{F1}$ is a $C_{4-7}$ linear perfluoroalkyl group;
$R^{F2}$ is a fluorine atom or a trifluoromethyl group; and
M is an alkali metal atom.
<4> The method according to <3>, wherein two molecules of the compound represented by the formula (4) is subjected to coupling reaction by an optical coupling reaction.
<5> The method according to <3>, wherein two molecules of at least one compound selected from the group consisting of the compound represented by the formula (5) and the compound represented by the formula (6), are subjected to a coupling reaction by an electrolytic coupling reaction.
<6> The method according to any one of <3> to <5>, wherein $R^{F1}$ is $F(CF_2)_4$— or $F(CF_2)_6$—, and $R^{F2}$ is a trifluoromethyl group.
<7> An inert cooling medium comprising the compound as defined in <1> or <2>.

Effect of the Invention

According to the present invention, a novel fluorinated ether compound useful as an inert medium is provided.

BEST MODE FOR CARRYING OUT THE INVENTION

In the present specification, a compound represented by the formula (1) is sometimes referred to as a compound (1). Likewise, a compound represented by another formula is referred to in the same manner. Further, unless otherwise specified, a pressure is represented by a gauge pressure.
The compound (1) of the present invention is a compound represented by the following formula:

$$R^{F1}OCFR^{F2}CFR^{F2}OR^{F1} \quad (1)$$

wherein $R^{F1}$ is a $C_{4-7}$ linear perfluoroalkyl group. A perfluoroalkyl group is a group wherein all of hydrogen atoms bonded to carbon atoms in an alkyl group are substituted by fluorine atoms. $R^{F1}$ is preferably —$(CF_2)_4F$, —$(CF_2)_5F$ or —$(CF_2)_6F$, and particularly preferably —$(CF_2)_4F$ or —$(CF_2)_6F$. $R^{F2}$ is a fluorine atom or a trifluoromethyl group, preferably a trifluoromethyl group.
As the compound (1), the following compound (1a) or the following compound (1b) is preferred in terms of usefulness as an inert medium:

$$F(CF_2)_4OCF(CF_3)CF(CF_3)O(CF_2)_4F \quad (1a)$$

$$F(CF_2)_6OCF(CF_3)CF(CF_3)O(CF_2)_6F \quad (1b).$$

With regard to the production of the compound (1) of the present invention, a known or well known method can be adopted, and the following methods may, for example, be mentioned.

METHOD 1: A method of fluorinating the following compound (3) by reacting it with fluorine in a liquid phase.

METHOD 2: A method of fluorinating the following compound (3) by means of a high-valent metal fluoride. As the said method, a cobalt fluorination method wherein cobalt trifluoride is employed for fluorination, may, for example, be mentioned.

METHOD 3: A method of fluorinating the following compound (3) by an electrochemical fluorination reaction (hereinafter referred to as an ECF method).

METHOD 4: A method wherein two molecules of the following compound (4), or two molecules of at least one compound selected from the group consisting of the following compound (5) and the following compound (6), are subjected to a coupling reaction:

$$R^1OCX^1R^2CX^2R^2OR^1 \quad (3)$$

$$R^{F1}OCFR^{F2}COF \quad (4)$$

$$R^{F1}OCFR^{F2}COOH \quad (5)$$

$$R^{F1}OCFR^{F2}COOM \quad (6).$$

In the formulae, $R^{F1}$ and $R^{F2}$ are as defined above, $X^1$ and $X^2$ which are independent of each other, represent a hydrogen atom or a fluorine atom. $R^1$ and $R^{F1}$, or $R^2$ and $R^{F2}$ correspond to each other, and $R^1$ is a group wherein a part or all of fluorine atoms in $R^{F1}$ are substituted by hydrogen atoms, or a group wherein a carbon-carbon bond of such a substituted group is changed into an unsaturated bond. $R^1$ is preferably an alkyl group having the same carbon skeleton as $R^{F1}$.

In a case where $R^{F2}$ is a fluorine atom, $R^2$ is a hydrogen atom and in a case where $R^{F2}$ is a trifluoromethyl group, $R^2$ is a methyl group. M is an alkali metal atom. As the alkali metal atom, a sodium atom, a potassium atom or a lithium atom may, for example, be mentioned, and a sodium atom or a potassium atom is preferred since preparation of the compound (6) is thereby easy.

The compound (3) in Methods 1 to 3 may be a known compound, or may be obtained by applying a known method to the known compound. As the compound (3), the following compound (3c) and the following compound (3d) may, for example, be mentioned:

$$H(CH_2)_4OCH_2CH_2O(CH_2)_4H \quad (3c)$$

$$H(CH_2)_6OCH_2CH_2O(CH_2)_6H \quad (3d).$$

The liquid phase fluorination method of Method 1 is carried out by the method described in Japanese Patent No. 2,945,693. Further, the fluorination by means of the cobalt fluorination method of Method 2 or the ECF method of Method 3 may be carried out by a known method, and the reaction conditions may be adjusted depending on the reactivity of the compound (3), the stability or the like.

By fluorinating the compound (3) by means of Methods 1 to 3, all of hydrogen atoms bonded to a carbon atom in the compound (3) will be converted to fluorine atoms, or fluorine atoms will bond to a carbon-carbon unsaturated bond. According to the fluorination reaction, for example, the following compound (1c) is produced from the compound (3c), and the following compound (1d) is produced from the compound (3d):

$$F(CF_2)_4OCF_2CF_2O(CF_2)_4F \quad (1c)$$

$$F(CF_2)_6OCF_2CF_2O(CF_2)_6F \quad (1d).$$

The compound (4) in Method 4 may be a known compound, or may be obtained by applying a known method to a known compound. As such a method, the following Method a, the following Method b or the following Method c may, for example, be mentioned:

METHOD a: A method to decompose an ester bond of a perfluoroester obtained by a liquid phase fluorination reaction;

METHOD b: A method employing an exchanging reaction; and

METHOD c: A method employing an addition reaction of hexafluoropropylene oxide (hereinafter referred to as HFPO).

Method a is carried out by employing the method described in WO00/56694 by the present applicants, using the following compound (7) as a starting material. Namely, Method a is carried out by a method wherein the compound (7) and the following compound (8) are subjected to an esterification reaction to obtain the following compound (9), and the compound (9) is subjected to fluorination in a liquid phase to obtain the following compound (10), and then the compound (10) thus obtained is subjected to a decomposition reaction of an ester bond to obtain the following compound (4) (wherein $R^1$, $R^2$, $R^{F1}$ and $R^{F2}$ are as defined above, $R^f$ represents a perfluorinated monovalent organic group, and the perfluorinated monovalent organic group is preferably a perfluoroalkyl group or a perfluoro(etheric oxygen atom-containing) alkyl group. Further, the compound (7) may be a known compound, or may be obtained by applying a known method to a known compound). Method a is preferred, since the starting material is easily available, and the compounds (4) having various structures can be prepared as desired.

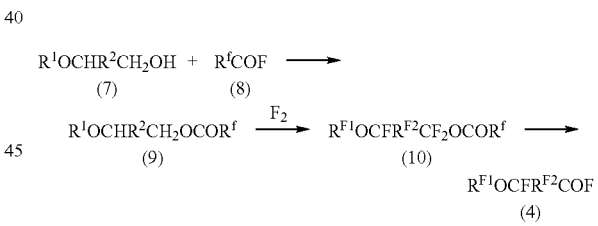

Method b is carried out by heating the following compound (12) together with the following compound (13) (wherein $R^{F1}$ and $R^{F2}$ are as defined above, and $R^{10}$ is a monovalent organic group and is preferably a perfluoroalkyl group or a (etheric oxygen atom-containing) perfluoroalkyl group). The exchanging reaction in Method b is a reaction wherein a —COOH moiety in the compound (12) is exchanged to a —COF moiety. Since such an exchanging reaction is an equilibrium reaction, it is preferred that the reaction is carried out while the compound (4) to be produced is withdrawn from the reaction system by a method such as reactive distillation.

$$R^{F1}OCFR^{F2}COOH\ (12) + R^{10}COF\ (13) \rightarrow$$
$$R^{F1}OCFR^{F2}COF\ (4) + R^{10}COOH\ (15)$$

Method c is an advantageous method for obtaining the following compound (4A) i.e. the compound (4) wherein $R^{F2}$ is a trifluoromethyl group. Method c may be carried out by adding HFPO to the following compound (11) (wherein $R^{F3}$ is a $C_{3-6}$ linear perfluoroalkyl group, and a $R^{F3}CF_2$— moiety in the compound (4A) corresponds to a $R^{F1}$ moiety in the compound (4)).

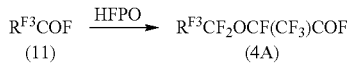

The compound (11) may be a known compound, or may be obtained by applying a known method to a known compound. A synthesizing method of the compound (11) may, for example, be a method wherein the following compound (16) is heated together with the following compound (13) to exchange a —COOH moiety of the compound (16) to —COF, or a method wherein the following compound (17) is made to react with fuming sulfuric acid so as to exchange a terminal iodine atom of the compound (17) to —COF (wherein $R^{F3}$ and $R^{10}$ are as defined above). Further, it is possible to synthesize the compound (11) in accordance with the method described in WO00/56694 by the present applicants, by employing a compound represented by the formula $R^3OH$ (wherein $R^3$ is a $C_{3-6}$ linear alkyl group, and is a group corresponding to $R^{F3}$)

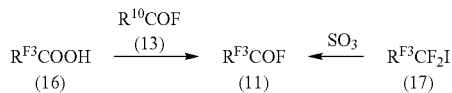

The compound (4) is preferably the following compound (4a) or the following compound (4b) from the viewpoint of availability and usefulness of an inert medium obtained by a coupling reaction.

$F(CF_2)_4OCF(CF_3)COF$     (4a)

$F(CF_2)_6OCF(CF_3)COF$     (4b)

Further, the compound (5) and the compound (6) in Method 4 may be known compounds or may be obtained by applying a known method to known compounds.

In the present invention, it is preferred that the compound (5) is obtained by a hydrolysis reaction of the compound (4).

The compound (6) is preferably obtained in a form of a solution or a suspension by adding an alkali metal hydroxide in a solution having the compound (5) dissolved in a polar solvent. The alkali metal hydroxide may, for example, be sodium hydroxide, potassium hydroxide or lithium hydroxide, and sodium hydroxide or potassium-hydroxide is preferred from the viewpoint that preparation of the compound (6) is easy and the solubility to the polar solvent is excellent. The polar solvent is preferably a single solvent or a mixed solvent comprising at least two kinds of solvents, selected from the group consisting of water; alcohols such as methanol or ethanol; nitrites such as acetonitrile; and glycols such as ethylene glycol or propylene glycol. As the solvent, it is particularly preferred to select the same solvent as a solvent to be employed in an electrolytic coupling reaction described hereinafter. By selecting such a solvent, the compound (6) can be directly subjected to the coupling reaction without being separated from the solvent.

As the compound (5), the following compound (5a) or the following compound (5b) is preferred from the viewpoint of availability and usefulness of an inert medium obtained by a coupling reaction, and as the compound (6), the following compound (6a), the following compound (6b), the following compound (6e) or the following compound (6f) is preferred:

$F(CF_2)_4OCF(CF_3)COOH$     (5a)

$F(CF_2)_6OCF(CF_3)COOH$     (5b)

$F(CF_2)_4OCF(CF_3)COONa$     (6a)

$F(CF_2)_6OCF(CF_3)COONa$     (6b)

$F(CF_2)_4OCF(CF_3)COOK$     (6e)

$F(CF_2)_6OCF(CF_3)COOK$     (6f)

As a method for producing the compound (1) of the present invention, Method 4 is preferred since a compound having a high-purity can thereby be efficiently produced industrially.

Method 4 is preferably a method wherein two molecules of the compound represented by the formula (4) are subjected to a coupling reaction by an optical coupling reaction or a method wherein two molecules of at least one compound selected from the group consisting of the compound represented by the formula (5) and the compound represented by the formula (6), are subjected to a coupling reaction by an electrolytic coupling reaction, and particularly preferably a method wherein one molecule of the compound represented by the formula (5) and one molecule of the compound represented by the formula (6), or two molecules of the compound represented by the formula (6), are subjected to a coupling reaction by an electrolytic coupling reaction.

In the coupling reactions in these methods, on a carbon atom to which —COF, —COOH or —COOM is bonded, a radical is generated respectively, and the compound (1) is obtained by coupling of two molecules of such a radical. For example, the compound (1a) is obtained from two molecules of the compound (4a), and the compound (1b) is obtained from two molecules of the compound (4b).

Further, a known method may be applied to the coupling reactions in Method 4. In a case where the optical coupling reaction is carried out, it is preferred to employ a low-pressure mercury lamp, a medium-pressure mercury lamp or a high-pressure mercury lamp, as a light source. The reaction temperature is preferably within a range of from 0 to +100° C., particularly preferably within a range of from 0 to +50° C. from the viewpoint of excellent reaction efficiency. The reaction may be carried out in the absence of a solvent, or it may be carried out by employing a solvent such as a perfluorocarbon or a perfluoroether, which is inactive to a photoreaction. The reaction pressure may be any of atmospheric pressure, reduced pressure or elevated pressure, and atmospheric pressure is preferred.

In a case where the electrolytic coupling reaction is carried out, the compound (1) is obtained by electrochemical decarboxylation of a supporting electrolyte comprising the compound (6), or the compound (5) and the compound (6). As an electrode of an electrolytic apparatus to be employed for the electrolytic coupling reaction, an electrode (e.g. platinum electrode) having a high redox potential is preferred. As the current density for the electrolytic coupling reaction, a current density of about 0.02 to 1.0 A/cm² is adopted, and it is preferably 0.03 to 0.5 A/cm² from such a viewpoint that it is thereby easy to control heat generation and the reaction efficiency is good. If the reaction is carried out at a high current density, it will be difficult to control heat generation associated with the reaction, and if the reaction is carried out at a low current density, the reaction efficiency will be deteriorated, such being practically undesirable for an industrial process.

The electrolytic coupling reaction may be carried out in the presence or absence of a solvent. In a case where the reaction is carried out in the presence of a solvent, a polar solvent is preferably employed as the solvent. The polar solvent may, for example, be an alcohol such as methanol or ethanol, a nitrile such as acetonitrile, or water. A single solvent or a mixed solvent comprising two or more solvents, selected from them, may be employed. In a case where a mixture of the compound (5) and the compound (6) is employed as the supporting electrolyte, it is preferred to incorporate 0.5 to 2.0 mol of the compound (6) per 1 liter of the compound (5) in order to improve the reaction efficiency.

The electrolytic coupling reaction may be carried out by a batch system, or it may be carried out by a continuous reaction system while the compound (5) and/or the compound (6) is continuously supplied to an electrolytic cell, and from the viewpoint of an excellent reaction efficiency, the latter is preferred. The reaction temperature for the electrolytic coupling reaction is usually within a range of from −10 to +100° C., preferably within a range of from 0 to +50° C. As the electrolytic cell, an electrolytic cell made of glass or resin is employed, and it is preferred to employ an electrolytic cell made of glass or fluororesin, since insulating properties are excellent. The reaction pressure may be any of atmospheric pressure, reduced pressure or elevated pressure, and atmospheric pressure is preferred.

By the coupling reaction, a crude reaction product containing the compound (1) is obtained, and the crude reaction product is preferably subjected to post-treatment. As methods of the post-treatment, extraction, washing, chromatography, heating and distillation may, for example, be mentioned, and it is carried out by a single method or a combination of two or more methods suitably selected from such methods. To carry out washing, it is preferred to employ water or an aqueous solution of an alkali metal bicarbonate such as $NaHCO_3$ or $KHCO_3$. To carry out heating, it is preferred that the crude reaction product is heated and refluxed, and it is particularly preferred that the crude reaction product is heated and refluxed in the presence of an alkali metal fluoride such as KF.

In a case where the compound (1) is to be employed in the medical field or the like, where a compound having a high-purity and a single-composition is required, it is preferred that the crude reaction product is heated and refluxed in the presence of KF and then subjected to washing with a 10% $KHCO_3$ aqueous solution, followed by distillation.

It is preferred that the compound (1) is purified to a degree of purity required depending on its particular application, and in an application where a product having a high-purity is desired, it is preferred to bring the purity measured by gas chromatography, high-performance liquid chromatography, NMR or the like to a level of at least 98%, particularly preferably at least 99%.

In the present invention, it is advantageous to produce the compound (1) by Method 4, since it is thereby possible to produce a desired compound (1) in high yield and formation of impurities by side reactions will be minimum. Further, Method 4 is also suitable as a method for obtaining the compound (1) having a high-purity and a single-composition, which is to be employed in the medical field or the like.

In Method 4, it is preferred to employ the compound (4) obtained by Method a, since it is thereby easy to obtain the starting material for the coupling reaction, and it is thereby easy to selectively produce a structure that shows optimal physical properties depending upon the particular application. As the compound (5) and the compound (6), it is preferred to employ the compound (5) or the compound (6) obtained from said compound (4). The compound (4) wherein $R^{F2}$ is a trifluoromethyl group, is preferably the compound (4A) obtained by a method of adding HFPO to the compound (11). The compound (5) and the compound (6) wherein $R^{F2}$ is a trifluoromethyl group, are preferably the following compound (5A) and the following compound (6A) (wherein the symbols are as defined above) obtained from said compound (4A). In a case where the compound (1) of the present invention is employed in the medical field, it is preferred to carry out Method 4 by employing the compound (5A) and the compound (6A):

$R^{F3}CF_2OCF(CF_3)COOH$ (5A)

$R^{F3}CF_2OCF(CF_3)COOM$ (6A)

The compound (1) of the present invention is a novel compound useful as an inert medium. Such a compound may effectively be used as an insulating oil in the field of electronics, as a medium for e.g. thermal shock tests or leak tests, as an oxygen carrier in the medical field, or as a cleaning or dewatering agent in the industrial field. Further, the majority of the compounds (1) have melting points of at most 0° C. and thus have an advantage such that their useful temperature ranges in the above applications are broad, and thus they may be effectively employed as refrigerant or coolant by utilizing such nature.

EXAMPLES

Now, the present invention will be described in detail with reference to Examples. However, it should be understood that the present invention is by no means restricted by such Examples. Further, in the following, gas chromatography is referred to as GC, and gas chromatography mass spectrometry is referred to as GC-MS. Further, the purity determined from the peak area ratio of GC is referred to as GC purity, and the yield is referred to as GC yield. Further, tetramethylsilane is represented by TMS, and fluorine gas diluted to 20% with nitrogen gas is referred to as fluorine gas diluted to 20%. Further, the NMR spectrum data are shown as apparent chemical shift ranges.

Example 1

Example I for Preparation of the Compound (1a)

Example 1-1

Example for Preparation of the Compound (4a) by HFPO Addition Reaction

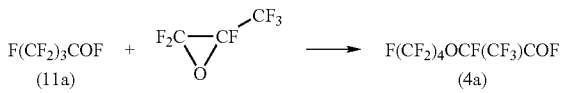

$F(CF_2)_3COF$ + $F_2C\underset{O}{\overset{CF}{\diagup\diagdown}}CF_3$ $\longrightarrow$ $F(CF_2)_4OCF(CF_3)COF$
(11a)                                                                (4a)

Into a hastelloy C autoclave having an internal volume of 2 L (liters), CsF (42 g) which was dehydrated and dried, was charged, and the interior of the reactor was evacuated. Into the reactor, $F(CF_2)_3COF$ (1,200 g) and tetraglyme (210 g) were charged, and then the reactor was cooled to −20° C. Then HFPO (922 g) was continuously fed thereto while the feed rate was controlled not to let the reaction temperature exceed 0° C. After the reaction, the reaction liquid was separated into two layers, and a fluorocarbon layer (2,044 g) (lower layer) was recovered. By subjecting such a layer to distillation purification, the compound (4a) (1,510 g) (GC purity: 99%) was recovered. The structure of the compound (4a) was determined by $^{19}FNMR$ spectrum and GC-MS spectrum analysis.

NMR spectrum of the compound (4a):

$^{19}$FNMR (282.7 MHz, solvent: CDCl$_3$, standard CCl$_3$F): δ (ppm) 26.5(1F), −78.8−−79.4(1F), −81.6(3F), −82.3(3F), −86.1−−86.6(1F), −126.7−−127.1(4F), −131.1(1F)

The GC-MS spectrum of the compound (4a):

MS (EI method, m/z): 335(M$^+$−COF), 313, 219, 169, 147, 131, 119, 100, 97, 69, 50, 47 (Calculated Exact Mass of C$_7$F$_{14}$O$_2$: 382.05)

Example 1-2

Example for Preparation of the Compound (1a) by Optical Coupling Reaction

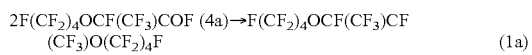
2F(CF$_2$)$_4$OCF(CF$_3$)COF (4a)→F(CF$_2$)$_4$OCF(CF$_3$)CF(CF$_3$)O(CF$_2$)$_4$F (1a)

Into a high-pressure mercury lamp reactor (the light source has a jacket made of quartz) made of glass, having an internal volume of 100 mL and equipped with a condenser, a stirrer was put, and the compound (4a) (146.2 g) obtained in Example 1-1 was charged. In order to remove oxygen dissolved in the reaction solution, heating under reflux was carried out for 1 hour in an argon stream. Then, while the light source was cooled by circulating the cooling water in the jacket made of quartz, 167 hours of light irradiation was carried out at room temperature. After completion of the light irradiation, a crude liquid (132.8 g) was recovered. The GC purity of the compound (1a) in the crude liquid was 64.0%, and 18.5% of the compound (4a) still remained. The conversion of the compound (4a) was 83.2%, and the selectivity for the compound (1a) was 79.6%. Further, the GC yield of the compound (1a) was 66.3%. The crude liquid was then subjected to distillation under reduced pressure, and the compound (1a) was recovered as a distillate. The GC purity of the distillate was 99.5%.

The compound (1a) had a boiling point of 85° C. to 88° C./8.0 kPa (absolute pressure), and it was liquid at room temperature. The structure of the compound (1a) was determined by $^{19}$FNMR spectrum and GC-MS spectrum analysis. In this regard, the symbols a to m put on F in the following formula are symbols to specify belonging of fluorine atoms in $^{19}$FNMR. Further, such belonging in $^{19}$FNMR was determined by the correlation of the two dimensional NMR (C—F cosy).

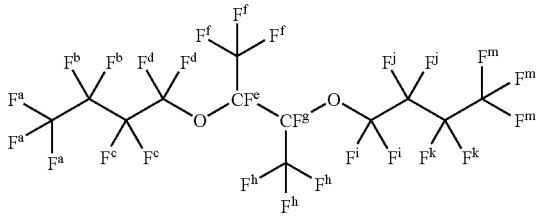
(1a)

NMR spectrum of the compound (1a):

$^{19}$FNMR (282.7 MHz, solvent: CDCl$_3$, standard (CCl$_3$F) δ (ppm) −81.0 and −87.0 (F$^a$ and F$^m$, each 3F), −126.8 (F$^b$ and F$^k$, 4F), −126.4−−126.3 (F$^c$ and F$^j$, 4F), −79.6−−81.1 (F$^d$ and F$^i$, 4F), −140.1 and 141.4 (F$^e$ an F$^g$, each 1F), −79.1 and −78.0 (F$^f$ and F$^h$, each 3F)

GC-MS spectrum of the compound (1a);

MS (EI method, m/z): 435(M$^+$-OCF$_2$CF$_2$CF$_2$CF$_3$), 335, 263, 219, 197, 169, 150, 131, 119, 100, 97, 69, 47.

MS (CI method, m/z, methane): 651(M$^+$−F), 689(M$^+$+F) (Calculated Exact Mass of C$_{12}$F$_{26}$O$_2$: 669.95).

Example 2

Example II for Preparation of the Compound (1a)

Example 2-1

Example for Preparation of the Compound (5a) by Hydrolysis Reaction

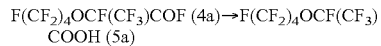
F(CF$_2$)$_4$OCF(CF$_3$)COF (4a)→F(CF$_2$)$_4$OCF(CF$_3$)COOH (5a)

Into a hastelloy autoclave having an internal volume or 200 mL, the compound (4a) (100 g) obtained in Example 1-1 and HCFC-225 (tradename: AK-225, manufactured by Asahi Glass Company, Limited) (100 g) were charged. The reactor was cooled not to let the reaction temperature exceed 30° C. and water (5.65 g) was dropwise added thereto with vigorous stirring. After completion of the dropwise addition, stirring was continued for 2 hours, and then the reactor was heated to remove HF formed as a byproduct while AK-225 was distilled off. Then, the autoclave was opened, and a crude liquid was recovered and subjected to distillation under reduced pressure to obtain the compound (5a) (84.4 g). The yield was 84.4%. The boiling point was 77.2° C./1.33 kPa (absolute pressure).

NMR spectrum of the compound (5a):

$^{19}$FNMR (282.7 MHz, solvent: CDCl$_3$, standard (CCl$_3$F) δ (ppm) −79.0 and −85.8(AB, 2F), −81.6(3F), −82.6(3F), −126.8(2F), −127.1(2F), −132.8(1F).

$^1$HNMR (282.7 MHz, solvent: CDCl$_3$, standard: TMS): δ (ppm) 9.3(COOH).

Example 2-2

Example I for Preparation of the Compound (1a) by Electrolytic Coupling Reaction

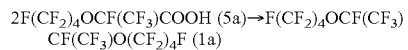
2F(CF$_2$)$_4$OCF(CF$_3$)COOH (5a)→F(CF$_2$)$_4$OCF(CF$_3$)CF(CF$_3$)O(CF$_2$)$_4$F (1a)

Into a 50 mL glass vial, a stirrer was put, and water (19.2 g), sodium hydroxide (1.6 g), the compound (5a) (15.1 g) obtained in Example 2-1 and acetonitrile (0.8 g) were charged in this order under cooling with ice, and then electrodes were dipped therein. For the anode and the cathode, a platinum mesh (80 mesh, 30 mm square) was employed, and a silver chloride electrode was employed for a reference electrode. Each electrode was used as put in a rough net-like polystyrene bag to prevent short-circuiting, and such electrodes were disposed to face each other in parallel with a distance of 3 mm. The surface area of the electrode dipped in the solution was about 9 cm$^2$. Under cooling with ice, electricity was conducted for 1.1 hours with a current value of 1.0 A. Shortly after the conduction of electricity, vigorous foaming was observed in the vicinity of the electrodes. The current density was 0.11 A/cm$^2$, the total charge amount was 41 mF, and the voltage between the anode and the cathode was 5.5 to 6 V.

After completion of the electrolysis, the reaction crude liquid separated into two layers, and the lower layer (11.5 g) was separated and recovered. The GC purity of the compound (1a) of the lower layer was 94.8%, and the compound (5a) was not detected. To the upper layer, CF$_3$CH$_2$OH (0.24 g) was added as an internal standard, and then, a part thereof was sampled, dissolved in deuterated water and then quantitatively analyzed by $^{19}$FNMR. The remaining of 9.25% equivalent amount of the compound (5a) was confirmed, but the compound (1a) was not detected. The conversion of the compound (5a) was 89.0%, and the selectivity for the compound (1a) was 91.7%. Further, the GC yield of the compound (1a) was 81.6%.

Example 3

Example II for Preparation of the Compound (1) by Electrolytic Coupling Reaction To a separable flask made of glass having an internal volume of 1.5 L and equipped with a jacket for circulating cooling water and a valve at the bottom, a mechanical stirrer, an agitating blade, a Dimroth condenser, a plunger pump and an internal thermometer were installed. For electrodes, a platinum mesh (80 mesh, 20 cm×10 cm) was employed. Each of such electrodes was put in a bag of polyethylene mesh to prevent short-circuiting, and such electrodes were disposed cylindrically to surround the agitating blade. In the Dimroth condenser and the jacket equipped, a coolant cooled to 0° C. was circulated.

Into the above separable flask, the compound (5a) (684 g) obtained in the same manner as in Example 2-1, sodium hydroxide (48.0 g), acetonitrile (135 mL) and ion-exchanged water (900 mL) were charged, and the electricity was conducted for 16.8 hours with a current value of 25 A with vigorous stirring. The current density was 0.125 A/cm$^2$, the total charge amount was 15.7 F, and the voltage between the anode and the cathode was from 11 to 13 V. From the beginning of conduction of the electricity to 14.4 hours later, the compound (5a) was continuously added at the rate of 300 g/h (0.81 mol/h) by using a plunger pump. The amount of the compound (5a) added was 4,320 g, and the total amount used was 5,004 g.

As the reaction proceeded, a crude product was precipitated at the bottom of the flask, and while it was optionally withdrawn from the valve equipped at the bottom of the flask, the reaction was continued. The total amount of the recovered crude product was 4,572 g. The crude product was analyzed by GC and found to contain 94.3% (GC purity) of the compound (1a). The GC yield was 97%, and the current efficiency was 84%.

Example 4

Example III for Preparation of the Compound (1a) by Electrolytic Coupling Reaction

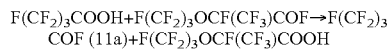

Into a distillation column equipped with a reflux condenser cooled to −5° C., F(CF$_2$)$_3$COOH (500 g) and FCOCF(CF$_3$)O(CF$_2$)$_3$F (780 g) were charged, and refluxing under heating was carried out while the internal pressure was maintained to be 0.1 MPa and the heat medium temperature to be from 120 to 150° C. As the reaction proceeded, the compound (11a) thus produced was withdrawn from the reaction system, and the compound (11a) (460 g) (GC purity: 99%) was recovered. The structure of the compound (11a) was determined by the NMR analysis. By employing such a compound (11a), the compound (4a) was obtained in the same manner as in Example 1-1, then, the compound (5a) was obtained in the same manner as in Example 2-1, and then the compound (1a) was obtained in the same manner as in Example 3.

Example 5

Example IV for Preparation of the Compound (1a) by Electrolytic Coupling Reaction Example 5-1

Example for Preparation of the Compound (9a) by Esterification Reaction

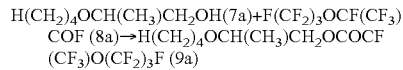

Into a hastelloy C autoclave having an internal volume of 2 L, the compound (7a) (500 g) was charged. With cooling the reactor, the compound (8a) (130 g) was slowly introduced so as to maintain the internal temperature at at most 30° C. under atmospheric pressure. And at the same time, with sufficient stirring, while nitrogen gas was bubbled, HF thus formed was removed from the reaction system. After the total amount of the compound (8a) was introduced, the reaction was further conducted for 12 hours at 30° C. to obtain a product. The product was analyzed by NMR and GC, whereby it confirmed that 99.0% of the compound (9a) was formed, and no unreacted compound (7a) was detected. This product (9a) was used directly for the following reaction without purification.

Example 5-2

Example for Preparation of the Compound (10a) by Fluorination Reaction

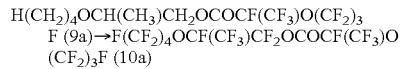

Into a 500 mL autoclave made of nickel, R-113 (312 g) was added, stirred and maintained at 25° C. At a gas outlet of the autoclave, a condenser maintained at 20° C., a NaF pellet packed layer and a condenser maintained at −10° C. were installed in series. Further, a liquid returning line was installed to return the condensed liquid from the condenser maintained at −10° C. to the autoclave. Nitrogen gas was blown thereinto for 1 hour at room temperature, and then fluorine gas diluted to 20% was blown thereinto for 1 hour at room temperature at a flow rate of 9.45 L/hr. Then, while the fluorine gas diluted to 20% was blown at the same flow rate, a solution having the compound (9a) (10 g) obtained in Example 5-1 dissolved in R-113 (100 g) was injected over a period of 6 hours. Then, while fluorine gas diluted to 20% was blown at the same flow rate, the internal pressure of the autoclave was raised to 0.15 MPa, and a solution having benzene dissolved in R-113 (benzene concentration=0.01 g/mL), was injected in an amount of 9 mL, while the temperature was raised from 25° C. to 40° C., whereupon the benzene injection inlet of the autoclave was closed, and stirring was continued for 0.3 hour. Then, while the internal pressure of the reactor was maintained at 0.15 MPa and the internal temperature of the reactor at 40° C., the above-mentioned R-113 solution of benzene (6 mL) was injected, whereupon the benzene injection inlet of the autoclave was closed, and stirring was continued for 0.3 hour. Further, the same operation was repeated once. The total amount of benzene injected was 0.22 g, and the total amount of R-113 injected was 21 mL. Further, while the fluorine gas diluted to 20% was blown at the same flow rate, stirring was continued for 1 hour. Then, the internal pressure of the reactor was adjusted to be

Example 5-3

Example for Preparation of the Compound (4a) by Thermal Decomposition Reaction

F(CF$_2$)$_4$OCF(CF$_3$)CF$_2$OCOCF(CF$_3$)O(CF$_2$)$_3$
F (10a)→ F(CF$_2$)$_4$OCF(CF$_3$)COF (4a)

Into a 2 L flask equipped with a condenser cooled to 10° C., the compound (10a) (200 g) obtained in Example 5-2 and a KF powder (16 g) were charged, and heated and stirred for 24 hours by employing a heat medium having the temperature maintained at from 100 to 130° C. After cooling, KF was removed, and the obtained crude liquid was distilled to obtain the compound (4a) (960 g). The purity of the compound (4a) was 99%.

Example 5-4

Firstly, the compound (5a) was obtained in the same manner as in Example 2-1 by employing the compound (4a) obtained in Example 5-3, and then the compound (1a) was obtained in the same manner as in Example 3.

Example 6

Example for Preparation of the Compound (1b)

Example 6-1

Example for Preparation of F(CF$_2$)$_5$COF

F(CF$_2$)$_6$I→F(CF$_2$)$_5$COF

Into a 4-necked flask equipped with a dropping funnel, a thermometer and a stirrer, a 60% fuming sulfuric acid (1,019 g) and phosphorus pentachloride (16 g) were charged, and F(CF$_2$)$_6$I (893 g) was added dropwise over a period of 3 hours at room temperature. When one-third of the total volume was added dropwise, heating was initiated, and the internal temperature was maintained at 70° C. After completion of the dropwise addition, the reaction was carried out at 70° C. for 14.5 hours with stirring. After completion of the reaction, the reaction crude product was cooled and left to stand still whereby it separated into two layers. The upper layer (580 g) was recovered and washed with 100% sulfuric acid. The upper layer was analyzed by GC, and it was confirmed that 64.0% of the desired F(CF$_2$)$_5$COF and 19.2% of the starting material were contained. The conversion of the starting material was 76.9%, and the GC yield of the desired product was 58.7%. By fractionating the upper layer, the desired product (330 g) was obtained with a GC purity of at least 99%. The boiling point was 62° C./(1.01325×10$^{-2}$) kPa (absolute pressure).

Example 6-2

Example for Preparation of the Compound (4b) by HFPO Addition Reaction

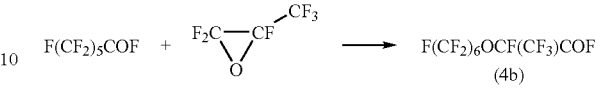

Anhydrous cesium fluoride (21.2 g) was charged into an inlet for a solid of an autoclave made of stainless steel having an internal volume of 700 mL, and the reactor was closed hermetically. The interior of the reactor was evacuated, and F(CF$_2$)$_5$COF (292 g) obtained in Example 6-1 and tetraglyme (107 g) were charged by aspiration. Then, while the temperature and the pressure inside the reactor were maintained to be at most 0° C. and at most 0 MPa, respectively, HFPO (159 g) was slowly charged. After completion of the reaction at room temperature with stirring overnight, stirring was terminated, and the system was left to stand still for 2 hours. And then, the autoclave was opened to recover a reaction crude product. The reaction crude product separated into two layers, and the lower layer (430 g) was recovered. Then the lower layer was analyzed by GC, and it confirmed that 82.1% of the desired compound (4b) and 5.8% of the starting material were contained. The conversion of the starting material was 91.5%, and the GC yield of the compound (4b) was 79.6%. By fractionating the lower layer, the compound (4b) (318 g) having a GC purity of at least 99% was obtained. The boiling point was 123° C./(1.01325×10$^{-2}$) kPa (absolute pressure).

Example 6-3

Example for Preparation of the Compound (1b) by Optical Coupling Reaction

2F(CF$_2$)$_6$OCF(CF$_3$)COF (4b)→F(CF$_2$)$_6$OCF(CF$_3$)CF (CF$_3$)O(CF$_2$)$_6$F (11b)

A reaction crude liquid (108.0 g) was recovered by carrying out the same reaction as in Example 1-2 except that the compound (4a) (146.2 g) was changed to the compound (4b) (115.01 g) and light irradiation time was set to be 100 hours. The GC purity of the compound (1b) in the reaction crude liquid was 63.4%, and 21.1% of the compound (4b) still remained. The conversion of the compound (4b) was 80.2%, and the selectivity for the compound (1b) was 82.3%. Further, the GC yield of the compound (1b) was 66.0%. By subjecting the reaction crude liquid to distillation under reduced pressure, the compound (1b) was recovered as a distillate. The GC purity of the distillate was 98.6%. The boiling of the compound (1b) was 108° C./1.1 kPa (absolute pressure), and it was liquid at room temperature. The structure of the compound (1b) was determined by $^{19}$FNMR spectrum and GC-MS spectrum analysis. In this regard, the symbols a to r put on F in the following formula are symbols to specify belonging of fluorine atoms in $^{19}$FNMR. Further, the belonging in $^{19}$FNMR was determined by the correlation of the two-dimensional NMR (C—F cosy).

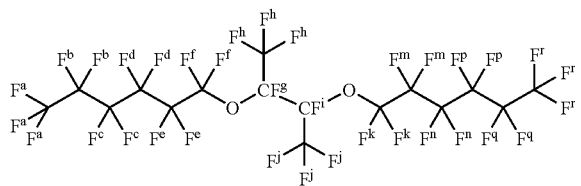

(1b)

NMR spectrum of the compound (4b);

$^{19}$FNMR (282.7 MHz, solvent: CDCl$_3$, standard (CCl$_3$F) δ (ppm) −81.8 (F$^a$ and F$^r$, 6F), −122.5, −123.2, −124.7−−126.0 (AB quartet), −126.7 (F$^b$, F$^c$, F$^d$, F$^e$, F$^m$, F$^n$, F$^p$, or F$^q$, each 2F), −79.4−−81.3 (F$^f$ and F$^k$, 4F), −140.2 and −141.6 (F$^g$ and F$^i$, each 1F), −78.0 and −79.2 (F$^h$ and F$^j$, each 3F).

GC-MS spectrum of the compound (4b);

MS (EI method, m/z): 535(M$^+$-OCF$_2$CF$_2$CF$_2$CF$_2$CF$_3$), 435, 319, 231, 219, 181, 169, 150, 131, 119, 100, 97, 69, 50, 47.

MS (CI method, m/z, methane): 851 (M$^+$−F), 889 (M$^+$+F) (Calculated Exact Mass of C$_{16}$F$_{34}$O$_2$: 869.94).

Example 7

Example of Stability Test

The compound (1a) obtained by the method in Example 1 and the compound (1b) obtained by the method in Example 6 were respectively charged in a hermetically-sealed container made of stainless steel, of which the interior was coated with PTFE (polytetrafluoroethylene), and anhydrous hydrogen fluoride was added thereto, and the container was sealed hermetically and left to stand still for 240 hours at 100° C. After being left, the compound (1a) and the compound (1b) were subjected to GC analysis. However, no formation of decomposed matters was detected.

INDUSTRIAL APPLICABILITY

The compound (1) of the present invention is a novel compound useful as an inert medium. Such a compound may effectively be used as an insulating oil in the field of electronics, as a medium for e.g. thermal shock tests or leak tests, as an oxygen carrier in the medical field, or as a cleaning or dewatering agent in the industrial field. Further, the majority of the compounds (1) have melting points of at most 0° C. and thus have an advantage such that their useful temperature ranges in the above applications are broad, and thus they may be effectively employed as refrigerant or coolant by utilizing such nature.

The entire disclosure of Japanese Patent Application No. 2003-372652 filed on Oct. 31, 2003 including specification, claims and summary is incorporated herein by reference in its entirety.

What is claimed is:

1. A compound represented by the following formula (1):

$$R^{F1}OCFR^{F2}CFR^{F2}OR^{F1} \quad (1)$$

wherein the symbols have the following meanings:
R$^{F1}$ is a C$_{4-7}$ linear perfluoroalkyl group; and
R$^{F2}$ is a trifluoromethyl group.

2. The compound according to claim 1, which is represented by the following formula (1a) or the following formula (1b):

$$F(CF_2)_4OCF(CF_3)CF(CF_3)O(CF_2)_4F \quad (1a)$$

$$F(CF_2)_6OCF(CF_3)CF(CF_3)O(CF_2)_6F \quad (1b).$$

3. A method for producing a compound represented by the following formula (1), comprising subjecting two molecules of a compound represented by the following formula (4) to a coupling reaction, or subjecting two molecules of at least one compound selected from the group consisting of a compound represented by the following formula (5) and a compound represented by the following formula (6), to a coupling reaction:

$$R^{F1}OCFR^{F2}COF \quad (4)$$

$$R^{F1}OCFR^{F2}COOH \quad (5)$$

$$R^{F1}OCFR^{F2}COOM \quad (6)$$

$$R^{F1}OCFR^{F2}CFR^{F2}OR^{F1} \quad (1)$$

wherein the symbols have the following meanings:
R$^{F1}$ is a C$_{4-7}$ linear perfluoroalkyl group;
R$^{F2}$ is a fluorine atom or a trifluoromethyl group; and
M is an alkali metal atom.

4. The method according to claim 3, wherein two molecules of the compound represented by the formula (4) are subjected to a coupling reaction by an optical coupling reaction.

5. The method according to claim 3, wherein two molecules of at least one compound selected from the group consisting of the compound represented by the formula (5) and the compound represented by the formula (6), are subjected to a coupling reaction by an electrolytic coupling reaction.

6. The method according to claim 3, wherein R$^{F1}$ is F(CF$_2$)$_4$— or F(CF$_2$)$_6$—, and R$^{F2}$ is a trifluoromethyl group.

7. An inert cooling medium comprising the compound as defined in claim 1.

8. A method for producing a compound as defined in claim 1, comprising subjecting two molecules of a compound represented by the following formula (4) to a coupling reaction, or subjecting two molecules of at least one compound selected from the group consisting of a compound represented by the following formula (5) and a compound represented by the following formula (6), to a coupling reaction:

$$R^{F1}OCFR^{F2}COF \quad (4)$$

$$R^{F1}OCFR^{F2}COOH \quad (5)$$

$$R^{F1}OCFR^{F2}COOM \quad (6)$$

$$R^{F1}OCFR^{F2}CFR^{F2}OR^{F1} \quad (1)$$

wherein the symbols have the following meanings:
R$^{F1}$ is a C$_{4-7}$ linear perfluoroalkyl group;
R$^{F2}$ is a fluorine atom or a trifluoromethyl group; and
M is an alkali metal atom.

9. The method according to claim 8, wherein two molecules of the compound represented by the formula (4) are subjected to a coupling reaction by an optical coupling reaction.

10. The method according to claim 8, wherein two molecules of at least one compound selected from the group consisting of the compound represented by the formula (5) and the compound represented by the formula (6), are subjected to a coupling reaction by an electrolytic coupling reaction.

11. The method according to claim 8, wherein R$^{F1}$ is F(CF$_2$)$_4$— or F(CF$_2$)$_6$—.

* * * * *